United States Patent
Rav-Acha et al.

(10) Patent No.: US 9,324,374 B2
(45) Date of Patent: Apr. 26, 2016

(54) METHOD AND SYSTEM FOR AUTOMATIC GENERATION OF CLIPS FROM A PLURALITY OF IMAGES BASED ON AN INTER-OBJECTS RELATIONSHIP SCORE

(71) Applicant: MAGISTO LTD., Nes-Ziona (IL)

(72) Inventors: Alexander Rav-Acha, Rehovot (IL); Oren Boiman, Givat Brener (IL)

(73) Assignee: MAGISTO LTD., Nes-Ziona (IL)

( * ) Notice: Subject to any disclaimer, the term of this patent is extended or adjusted under 35 U.S.C. 154(b) by 0 days.

(21) Appl. No.: 14/538,361

(22) Filed: Nov. 11, 2014

(65) Prior Publication Data

US 2015/0131973 A1    May 14, 2015

Related U.S. Application Data

(60) Provisional application No. 61/902,307, filed on Nov. 11, 2013.

(51) Int. Cl.
*G11B 27/02* (2006.01)

(52) U.S. Cl.
CPC ...................... *G11B 27/02* (2013.01)

(58) Field of Classification Search
CPC .............. G06T 7/001; G06T 2207/30221; H04N 5/262; H04N 5/2351; H04N 7/18; H04N 19/87; G11B 27/02
See application file for complete search history.

(56) References Cited

U.S. PATENT DOCUMENTS

2011/0242130 A1* 10/2011 Toba .................. G06T 11/00
                                                       345/629

OTHER PUBLICATIONS

Carsten Rother, Sanjiv Kumar, Vladimir Kolmogorov and Andrew Blake, Digital Tapestry, CVPR 2005.
Paul Viola and Michael Jones, Robust Real-time Object Detection, IJCV 2001.
Navneet Dalal, Bill Triggs and Cordelia Schmid, Human detection using oriented histograms of flow and appearance, ECCV 2006, pp. 428-441.
Jamie Shotton, John Winn, Carsten Rother and Antonio Criminisi, TextonBoost, Joint Appearance, Shape and Context Modeling for Multi-Class Object Recognition and Segmentation in European Conference on Computer Vision (2006), pp. 1-15.
W. Zhao, R. Chellappa, A. Rosenfeld and P.J. Phillips, Face Recognition: A Literature Survey, ACM Computing Surveys, 2003, pp. 399-458.
M. Irani and S. Peleg, Motion Analysis for Image Enhancement: Resolution, Occlusion, and Transparency . Journal of Visual Communication and Image Representation, vol. 4, No. 4, pp. 324-335, Dec. 1993.

(Continued)

*Primary Examiner* — Huy T Nguyen
(74) *Attorney, Agent, or Firm* — Pearl Cohen Zedek Latzer Baratz LLP

(57) ABSTRACT

A method and a system for automatic generation of clips from a plurality of images based on inter-object relationships score are provided herein. The method may include: obtaining a plurality of images, wherein at least two of the images contain at least one object over a background; analyzing at least some of the images to detect objects; extracting geometrical meta-data of at least some of the detected objects; calculating an inter-object relationships score for at least some of the detected objects; and determining a spatio-temporal arrangement of at least some of the objects and at least some of the images based at least partially on the inter-object relationships score and the geometrical meta-data of at least some of the detected objects.

24 Claims, 8 Drawing Sheets

(56) References Cited

OTHER PUBLICATIONS

M. Turk, A. Pentland, Eigenfaces for Recognition, Journal of Cognitive Neurosicence, vol. 3, No. 1, 1991, pp. 71-86.
Laurent Itti, Christof Koch and Ernst Niebur, A Model of Saliency-based Visual Attention for Rapid Scene Analysis, IEEE Transactions on Pattern Analysis and Machine Intelligence, vol. 20, pp. 1254-1259, Nov. 1998.
Kaminski Jeremy Yirmeyahu, Shavit Adi, Knaan Dotan and Mina Teicher, Head orientation and gaze detection from a single image, International conference of computer vision theory and applications. 2006.

* cited by examiner

US 9,324,374 B2

METHOD AND SYSTEM FOR AUTOMATIC GENERATION OF CLIPS FROM A PLURALITY OF IMAGES BASED ON AN INTER-OBJECTS RELATIONSHIP SCORE

CROSS-REFERENCE TO RELATED APPLICATIONS

This application claims the benefit of U.S. Provisional Patent Application No. 61/902,307, filed on Nov. 11, 2013, which is incorporated herein by reference in its entirety.

FIELD OF THE INVENTION

The present invention relates generally to computer vision, and more particularly, to employing computer vision techniques in generating clips from a plurality of images.

BACKGROUND OF THE INVENTION

Prior to the background of the invention being set forth, it may be helpful to set forth definitions of certain terms that will be used hereinafter.

The term "object" as used herein is defined as an entity in an image (e.g. a photo), or set of images, that corresponds to a real object in the world, e.g. a person, pet or even an inanimate object as a car. Therefore, a single person that is recognized in multiple images will be considered as a single object, having several instances.

As smartphones with cameras become ubiquitous, people take photos on a daily basis. A compelling way to view these images is by creating a music clip from them. However, the process of editing the images and providing a soundtrack is both time consuming and requires editing knowledge. One of the most important challenges is to order the photos or the images in such a way that will "tell a story" rather than an otherwise unarranged sequence of images. The term "story telling" used herein is sometimes referred elsewhere as "cinematography".

It would be advantageous to use the computing power of a computer for making the decisions of the ordering and arrangement of the captured images, to create a clip that will be interesting to watch in the sense of a "story told" by the clip.

SUMMARY OF THE INVENTION

According to some embodiments of the present invention, an object-based editing of image sets is described, where the image sets can be manipulated in both space and time. This will serve as the image ordering or arrangement function. Furthermore, some images may be omitted or selected multiple times, undergoing different cropping operations that correspond to different framings or objects shown in each.

According to some embodiments of the present invention, the music clip may be generated by optimizing a cost function (denoted as the "inter-object relationships" score) which takes into account the relations between the different objects that were detected in these images, and various framing options in which these objects can be displayed.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
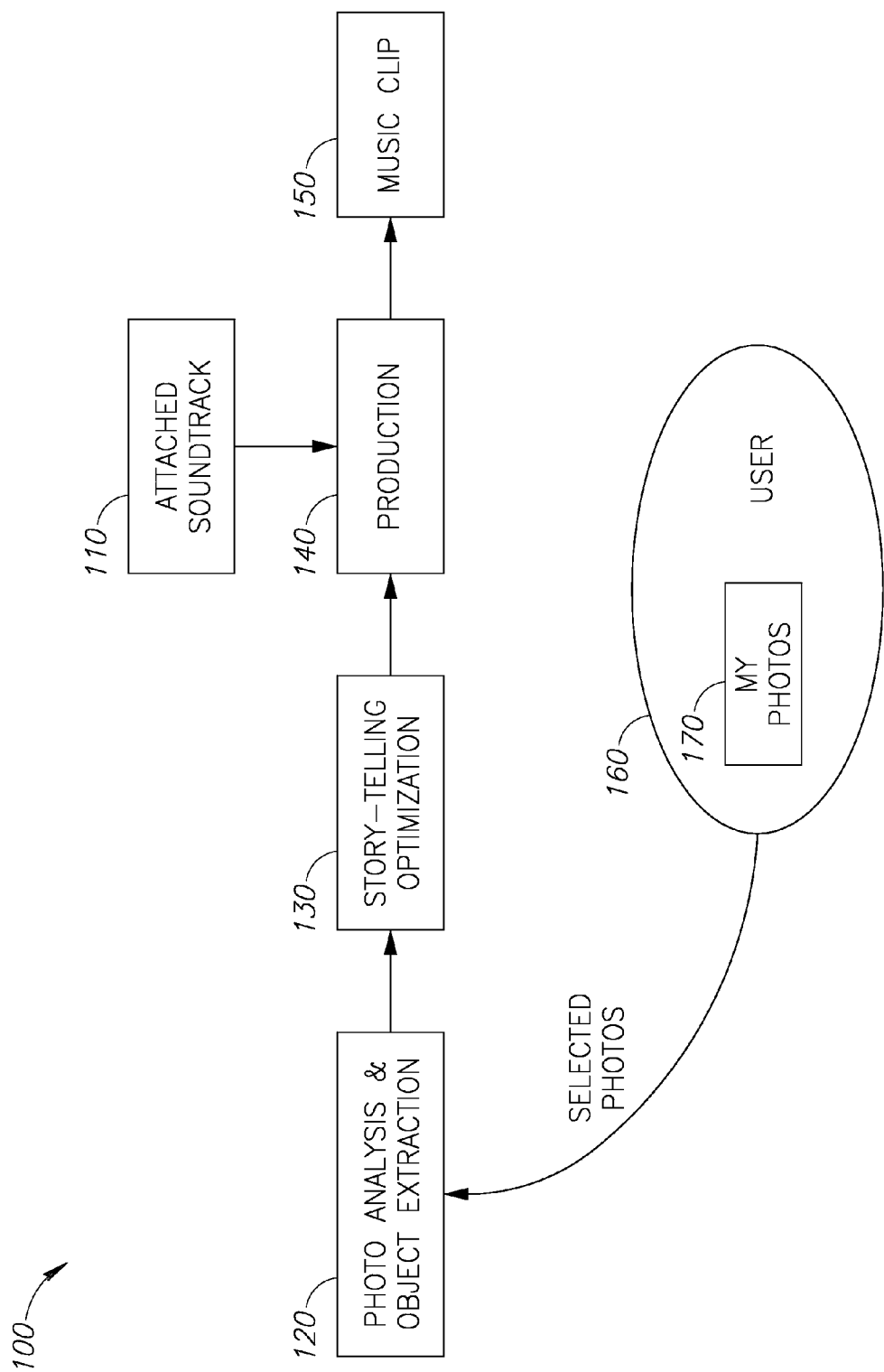
FIG. 1 is a schematic block diagram illustrating a system according to embodiments of the present invention.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments or of being practiced or carried out in various ways. Also, it is to be understood that the phraseology and terminology employed herein is for the purpose of description and should not be regarded as limiting.

FIG. 1 is a block diagram illustrating a schematic flow of a system 100 in accordance with some embodiments of the present invention. System 100 may obtain a plurality of photos, usually 'my photos' 170 being a repository of photos taken by a user 160. The first element of system 100 is the photo-analysis and objects extraction module 120 possibly executed by a computer processor (not shown). In objects extraction module 120, the images are analyzed, and various objects such as people, pets or other types of objects are extracted.

The second element is the "story-telling" optimization module 130 which may also be referred as "inter-object relationships" optimization. In the "story-telling" optimization module 130, portions of the captured photos (hereinafter: images) may be organized in space and time to create a so-called narrative being a sequence of occurrences of one or more contexts. The organization of the objects and image portions may be based on an analysis of the objects extracted in the first block, and is may be carried out by optimizing a so-called "inter-object relationships" score function. An example for a component in the inter-object relationships score function is the level of continuity in the objects: For example, two images will get a high score for being shown sequentially if they include instances of the same object. Other exemplary components of the inter-object relationships score function will be detailed herein.

The third element (being optional) is the production module 140. Production module 140 is responsible for adding transitions and effects to the music clip 150, synchronizing the transitions and effects with the music (e.g., synchronizing them to the beats of an attached soundtrack 110), stitching portions of images that will appear together in music clip 150, and the like.

Figure 2:
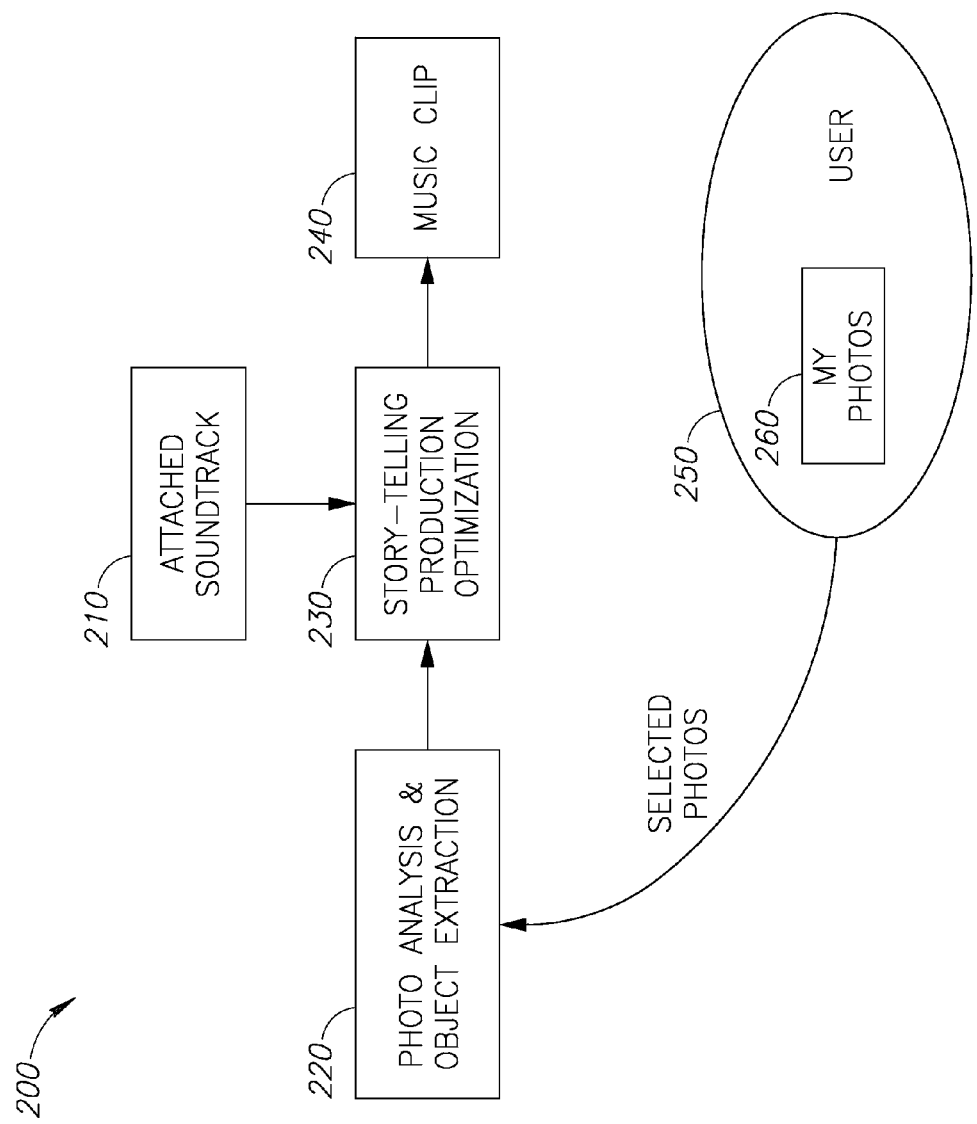
FIG. 2 is a schematic block diagram illustrating a system according to embodiments of the present invention.

FIG. 2 is a schematic block diagram illustrating an alternative implementation of a system 200 according to other embodiments of the present invention. Similarly to system 100, system 200 obtains selected photos from a 'my photos' repository 260 of a user 250. However, as shown here, the "story telling" optimization and the production modules may be unified to a single block 230, in which optimizing the inter-object relationships function and some production parameters (such as the synchronization to music) are carried out simultaneously. An attached soundtrack 210 may be then added to create a music clip 240.

Following below are more details on the photo-analysis object extraction module 220. An 'Object' may be defined herein an entity in an image, or set of images, that corresponds to a real object in the world, for example, a person, a pet or even an inanimate object such as a car. Therefore, a single person that is recognized in multiple images will be considered as a single object, having several object-instances. Formally, if two object-instances $O_1$ and $O_2$ correspond to the same object in the world (e.g.—images of the same person), it would be possible to state that object $(O_1)$=object $(O_2)$. However, for the sake of simplicity, "object-instances" may be referred herein as "objects", when it is clear that an object might have several instances in different images.

Usually the focus would be on extracting interesting objects only, for example, people and pets, and ignore objects that relate to the background such as trees, houses, and the like.

There are various known ways to extract objects from images. Following are described several such methods that can be used for this task:

Detecting a pre-determined class of objects, such as faces, is a well-known problem in computer vision, and there exist a large number of methods that addresses this problem. The detection can be done, for example, using pattern recognition algorithms known in the art for detecting faces, for detecting persons, or for detecting general pre-defined classes of objects. Optionally, an object can be manually indicated by the user, e.g., by tapping on top of the camera's screen, where an instance of this object appears.

An object may correspond to a specific entity and not a general class, e.g., a specific person. To common approach to detect a specific person is using general Face Detection followed by face recognition which identified the specific person.

Objects can also be detected without pre-defining them. For example, detecting objects based on saliency detection algorithms (assuming that the object is salient relative to the background).

In this section, an "inter-object relationships" score will be described in further details, whose optimization is used to determine the organization of the object-instances in the music clip. This is in contrast to a common approach for slide-show generation which simply displays the images in their original order (either based on their capture times, or on the order of their selection by the user), and without cropping the images around objects according to some story telling criterions.

In the video editors and photographers communities, it is common to refer to different types of positioning of an object in a picture. There are various common positioning types, such as: Long-shot, Medium shot, Close-Up, Extreme-Close-Up, American, and the like. These types of positioning will be referred herein as "Framing" types, and will determine the framing of the objects in the output music clip as part of the inter-object relationships optimization. Given a positioning of an object in the frame, its "Framing" type is determine by the relationship between the size of the object and the size of the image in which it appears. For example, for the case of a person, the framing is usually determined by the ratio between the size of the face and the height of the region in the image bellow the face. A simple way to change the framing of an object is to use image cropping.

Figure 3:
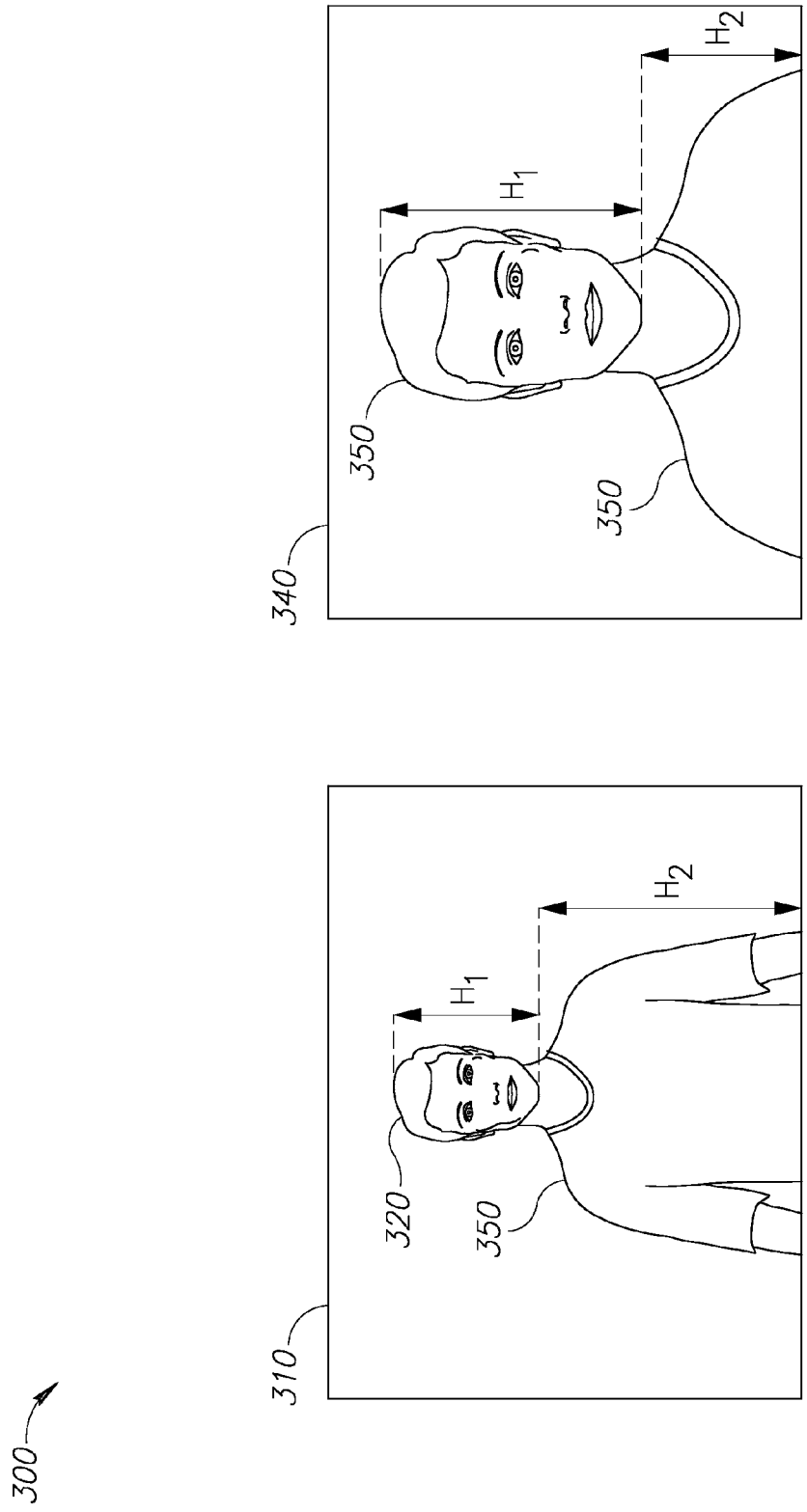
FIG. 3 is a diagram illustrating an aspect of the system in accordance with embodiments according to the present invention.

FIG. 3 is a diagram 300 illustrating an aspect of the system in accordance with embodiments according to the present invention. The figure demonstrates two framing types: Medium Shot 310 and Close-Up 340. One way to define a framing type for the case of a person is by comparing the ratio $H_1/H_2$ to pre-defined thresholds where $H_1$ related to the head 320 of the person and $H_2$ relates to the torso 350 of the same person. The framing for general objects can be defined, for example, based on the portion of the image captured by the object (e.g., if it is big enough, it will be denoted as a "Close-Up", and the like).

As mentioned before, the Story-Telling optimization determines the organization of objects in the output video clip. In this section we define the space of possible object organizations over which we optimize the story-telling score.

Assume that there are K object-instances $\{O_1, \ldots, O_k\}$ detected in the images, and there is a pre-determined set of possible framing types $\{fr_1, \ldots fr_l\}$ such as 'Close-Up', 'Medium-Shot', and the like.

Figure 4:
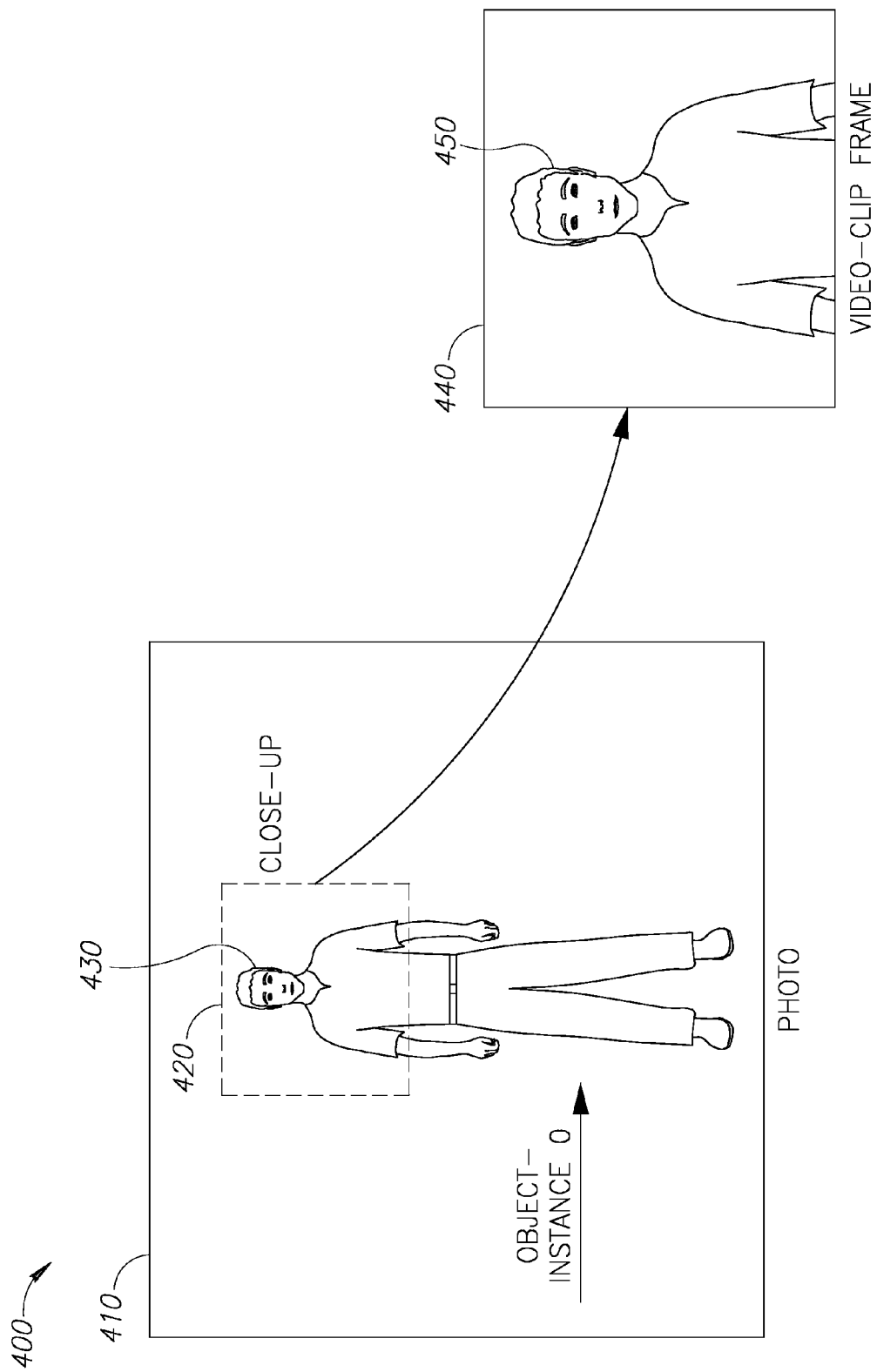
FIG. 4 is a diagram illustrating an aspect of the system in accordance with embodiments according to the present invention.

A reframing pair $P=(O_i, fr_j)$ may be defined as a pair of object-instance and a framing type: This pair refers to the fact that object-instance $O_i$ appears in the resulting video clip in framing $fr_j$ (which can be obtained, for example, by cropping the image accordingly). FIG. 4 demonstrates an actual implication of such a pair. Obviously, not all pairs of object-instances and framing types are possible: for example, an object that appears in the original image in a medium-shot, cannot appear in the video clip in long-shot. It should be noted that an object may be selected multiple times (including zero), possibly having different framings.

A special case for a reframing pair is the background (which can be considered as a special object), which may also be selected. Usually, the background is shown without cropping, and is considered as a Long-Shot framing (as the image is not focused on any specific object). Thus, images without any "foreground" object can also be displayed in the resulting clip. A relationship between the background object and a regular object may be "The object resides inside the scene corresponding to the background object".

FIG. 4 is a diagram 400 illustrating an aspect of the system in accordance with embodiments according to the present invention. FIG. 410 illustrates the implication of the pair (O, 'Close-Up'). The object instance O is displayed in the video clip in a 'Close-Up' framing 440 taken by cropping 420 from image 410. Where only the head 420 of the user is extracted to be presented 450.

The Story Telling score aims to encourage states that "Tell a good story". This definition is very subjective, but there are objective rules and properties that can make a video clip feel as if it better tells a story, for example, by minimizing cuts between un-related objects.

Optimizing the story telling score gives a spatio-temporal arrangement of the objects, and respectively, a spatio-temporal arrangement of image portions that contains these objects.

By way of non-limiting illustration, several such objectives whose combination gives a Story Telling score will be described herein:

Preserving the Chronological Time

In one embodiment, the Story Telling score is penalized whenever the objects appear in the wrong chronological order as in Eq. (1) below:

$$E^{t-cont}(s_i, \ldots, s_n) = \sum_{\{i>j\}} \sum_{\{O_1 \text{ in } S_i, O_2 \text{ in } S_j\}} \begin{cases} f|t(O_1) - t(O_2)| & \text{if } t(O_1) < t(O_2) \\ 0 & \text{else} \end{cases} \quad \text{Eq. (1)}$$

Were t(O) denotes he capture-time of the object instance O, and f is some cost function (e.g.—f can be constant 1). And wherein a state S is an ordered list of sets $(s_1, s_2, \ldots s_n)$, each $s_i$ being a set of reframing pairs. A desired length of the output video (based on user preferences, or based on the original number of images) may be defined, and penalizes states whose length differs from this length as in Eq. (2) below:

$$E^l(s_i, \ldots, s_n) = f(|l-l_0|) \quad \text{Eq. (2)}$$

Continuity

Where $l_0$ is the desired length and f is some cost function (e.g.—square distance). It would be preferable to display multiple instances of the same object sequentially, rather than jumping between different objects: This can be formalized as in Eq. (3) below:

$$E^{object-cont}(s_i, \ldots, s_n) = \sum_i \sum_{\{O_1 \text{ in } S_i, O_2 \text{ in } S_{i+1}\}} \begin{cases} 0 & \text{if object}(O_1) = \text{object}(O_2) \\ 1 & \text{else} \end{cases} \quad \text{Eq. (3)}$$

Where $\text{object}(O_1) = \text{object}(O_2)$ means that $O_1$ and $O_2$ correspond to the same object in the real world.

Object Representation

It would be advisable to panelize objects that appear in the images but are not well represented in the output video clip. Eq. (4) below addresses this problem:

$$E^{rep}(s_i, \ldots, s_n) = \Sigma_{Obj \in \{detected\ object\}} W(Obj) \text{ if Obj not in } S_i \quad \text{Eq. (4)}$$

It is usually advisable to make a continuous selection of framing around consecutive objects in time. For example— moving from Close-Up to Close-Up, or from Medium-Shot to Medium-Shot (General transition cost can be defined between each pair of framing options). This cost may be denoted as $E^{framing-cont}$, where W(Obj) is the importance of the object. The importance of an object can be determined manually by the user, or automatically estimated based on various parameters (e.g.—people are more important than pets, objects with many instances are more important than object having only a few instances). In an optional implementation, the representativeness can depend also on the framing in which the object appears (e.g., a Close-Up framing receives a better representation score than a Long-Shot).

It some embodiments, each object instance is forced to appear at least once in the output video. Sometimes it is desirable to place two objects in the same frame, if they refer to each other (i.e., they are strongly related). For example, two people that are looking at each other, speaking to each other, doing a similar activity, are nearby in space or time, and the like. Eq. (5) below illustrates it:

$$E^{relevance}(s_i, \ldots, s_n) = \sum_i \sum_{\{O_1, O_2 \text{ in } S_i\}} \begin{cases} 0 & \text{if refer}(O_1, O_2) = 1 \\ 1 & \text{else} \end{cases} \quad \text{Eq. (5)}$$

where refer$(O_1, O_2)$ is an indicator whether $O_1$ and $O_2$ refers to each other (i.e., are strongly related). Detecting that two objects refer to each other can be done, for example, based on gaze-estimation algorithms and checking if they are looking in the direction of each other, or by measuring there distance in which they appear in space-time.

Alternatively, common cinematographic editing approach prefer to tell the story by displaying the two objects in consecutive frames, preferably also passing throw a close-up framing. One such example can be based on Eq. (6)

$$E^{relevance}(s_i, \ldots, s_n) = \sum_i \sum_{\{O_1 \text{ in } S_i, O_2 \text{ in } S_{i+1}\}} \begin{cases} 0 & \text{if refer}(O_1, O_2) = 1 \\ 1 & \text{else} \end{cases} \quad \text{Eq. (6)}$$

The story telling score is a unification of all scores. A simple unification option is by summing them all in Eq. (7) below:

$$E^{story} = a \cdot E^{t-cont} + b \cdot E^l + c \cdot E^{object-cont} + d \cdot E^{rep} + e \cdot E^{framing-cont} + f \cdot E^{relevance} \quad \text{Eq. (7)}$$

where a, . . . , f are constant weightings.

Other scores can be used, such as different types of continuity, scores that are relevant only to different parts of the edited video for example first set, and the like.

Optionally, appearance-based scores can also be used, for examples ones that encourage coherence in the appearance between objects that appear in the same frame. Such a score is described in the art for the problem of creating image tapestries (also denoted as "Image Collages"). In addition, packing considerations can also be used: e.g., adding a score that avoids joining in the same set object-instances that cannot be packed together to the frame-size of the output video.

Optionally, the space-time arrangement may also determine the timing of each set in the output video clip (i.e., the times in which each object-instance appears and disappears, or even the list of visual effects applied on this object-instance. In this case, the reframing pairs $P=(O_i, fr_j)$ are replaces with 4 tuples: $P=(O_i, fr_j, t_{start}, t_{end})$, or 5-tuples: $P=(O_i, fr_j, t_{start}, t_{end}, e)$, where e is a list of visual effects (from a predetermined pool of effects, such as different color filters, zoom-in, etc'). This case corresponds to the flow that was described in FIG. 2, i.e., a combined optimization of Story-Telling and production 230.

The combined optimization of Story-Telling and production, requires as input also the attached soundtrack analysis (relating to the music that will be added to the output video clip), in order to synchronize the transition times (determined by ($t_{start}$, $t_{end}$)) to points of interest in the music, e.g., beats and down beats.

In this block, the automatic video production of the selected objects is done. In the trivial implementation, object instances that were selected to appear at the same time (i.e., belongs to the same set $s_i$ can be displayed together using a split screen, and each set is shown for a pre-determined amount of time.

However, the method can also provide a much more compelling automatically produced video clip. The automatic production makes use of a library of effects, transitions, graphic assets and sound tracks, which are determined according to the images and the Story-Telling organization. For instance, an algorithm can choose to use a face-morphing transition effect between two images, or add camera movements to each image. In addition, object instances that are shown together can be stitched in more compelling ways than simple split, e.g., using an image collage technique known in the art.

The selection of transitions and effects may take into account the inter-object relationships. For example, applying certain transitions such as face-morphing only between instances of the same object or between multiple objects that refer to each other.

In addition, the production stage might correspond to synchronizing the transitions to the attached soundtrack (In the case that this synchronization was not done in the Story-Telling block)

Figure 5:
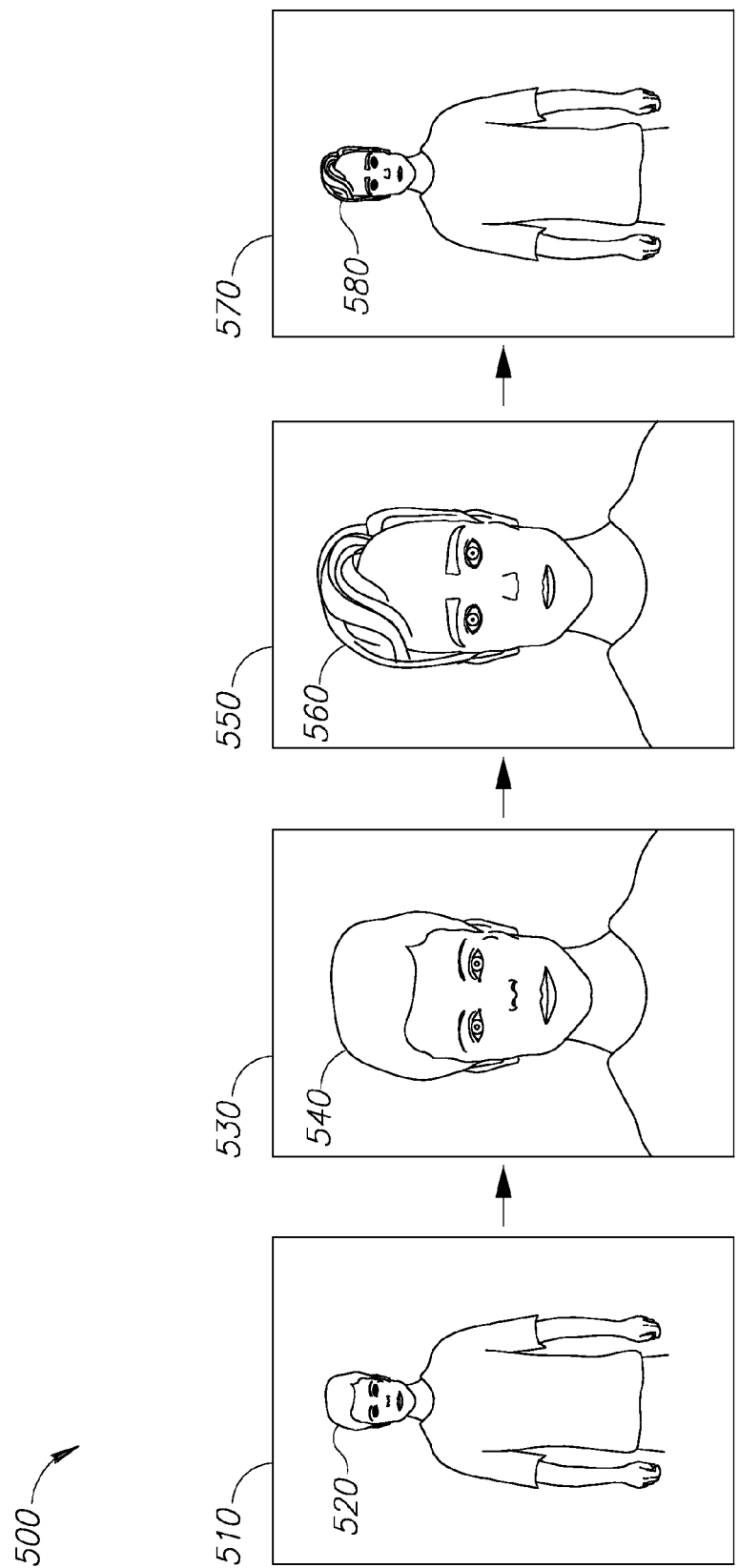
FIG. 5 is a diagram illustrating another aspect of the system in accordance with embodiments according to the present invention.

FIG. 5 is a diagram illustrating another aspect of the system in accordance with embodiments according to the present invention. Two objects (persons) were extracted and a relationship of communication has been detected between the, and so the inter-object function may provide scores accordingly. Thus, a sequence of cropping the original photo showing the two persons into a single phot 510 showing a long shot of person 520 may proceed to a close-up 530 showing a head shot 540 of the user. Then a close-up of the second person 560 is shown 550. This will represent in the clip the relationship of communication between the two persons as the head after head sequence infer a conversation taking place. Finally, a long shot photo 570 is being created of person 580 indicating that the communication session between the two persons is over.

Figure 6:
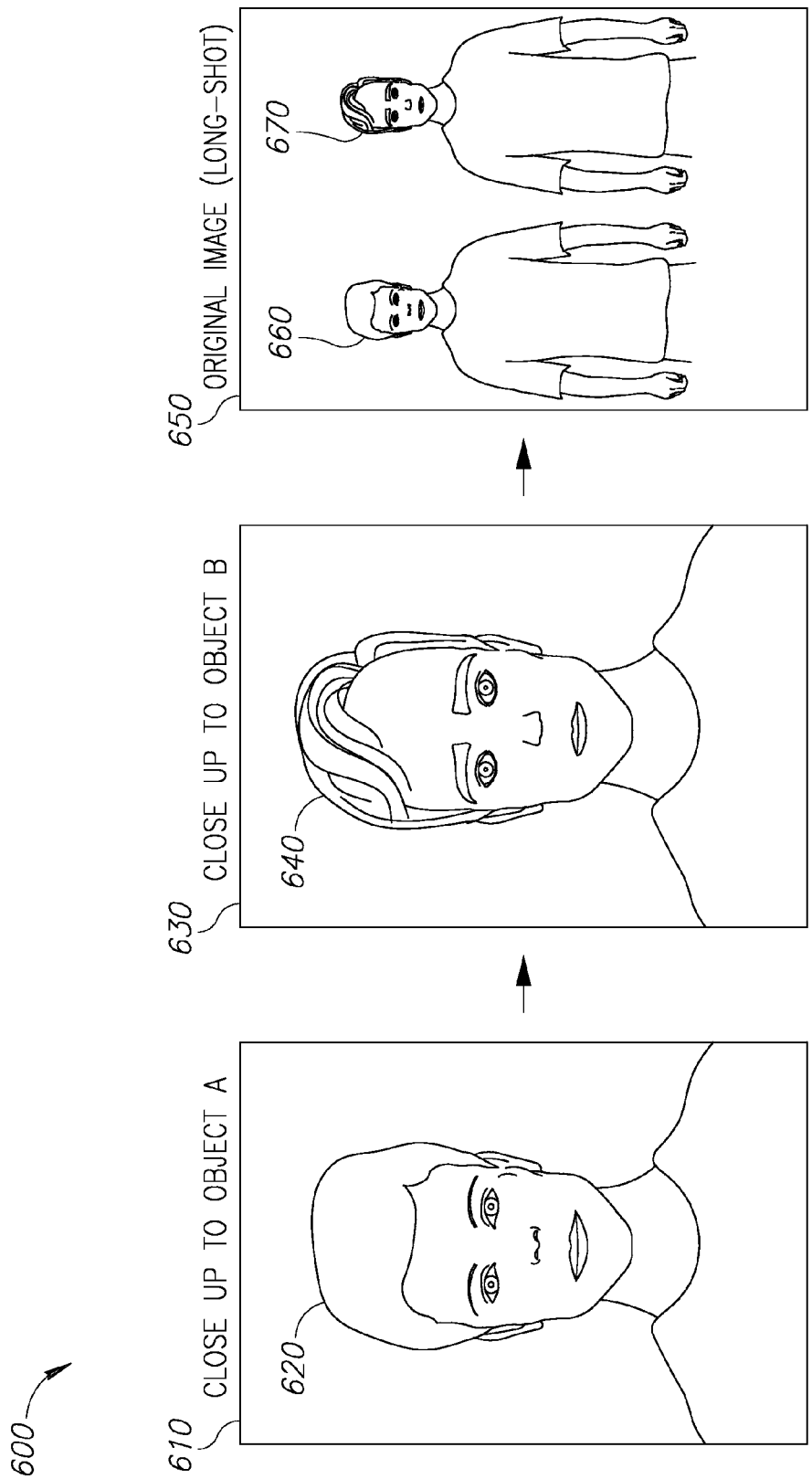
FIG. 6 is a diagram illustrating yet another aspect of the system in accordance with embodiments according to the present invention.

FIG. 6 is a diagram illustrating yet another aspect of the system in accordance with embodiments according to the present invention. An original photo 650 infers that the two persons 660 and 670 are related to each other (walking together, talking with each other and the like). Once this is detected, an artistic cinematographic editing sequence is carried out so that a close-up 610 on object A 620 is shown, then a close-up 620 of object B 670 is shown and only then the original photo 650 showing both person A 660 and person B 670 alike. In this sequence, some level of surprise to the viewer is achieved. The surprise occurs once it is revealed that both persons 660 and 670 are located physically next to each other. This surprise, according to cinematographic editing principles has an effect of an aesthetic value. The story telling function in one embodiment is affected by the concept of information theory according to which a repetitive sequence exhibit little information while a diverse, surprising sequence exhibits a high amount of information delivered. A story telling function providing high scores is therefore indicative of a tempo-spatial arrangement of objects that exhibit a high amount of information.

Figure 7:
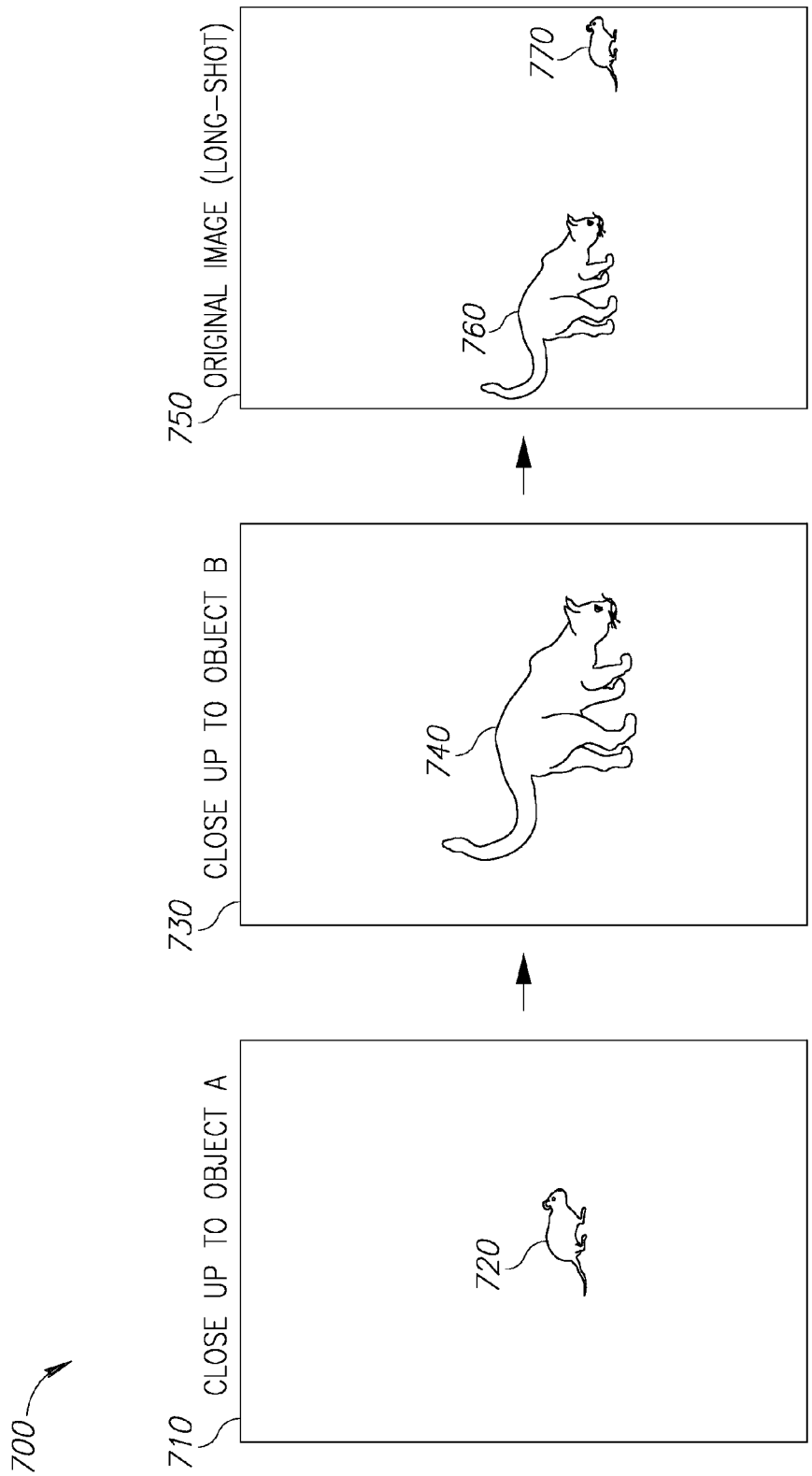
FIG. 7 is a diagram illustrating yet another aspect of the system in accordance with embodiments according to the present invention.

FIG. 7 is a diagram illustrating yet another aspect of the system in accordance with embodiments according to the present invention. An original photo 750 infers that a cat 760 chases a mouse 770 are related to each other in this manner. Once this is detected, an artistic cinematographic editing sequence is carried out so that a close-up 710 on mouse 720 is shown, then a close-up 730 of cat 740 is shown and only then the original photo 750 showing both cat 760 and mouse 770 engaged in the chase.

Figure 8:
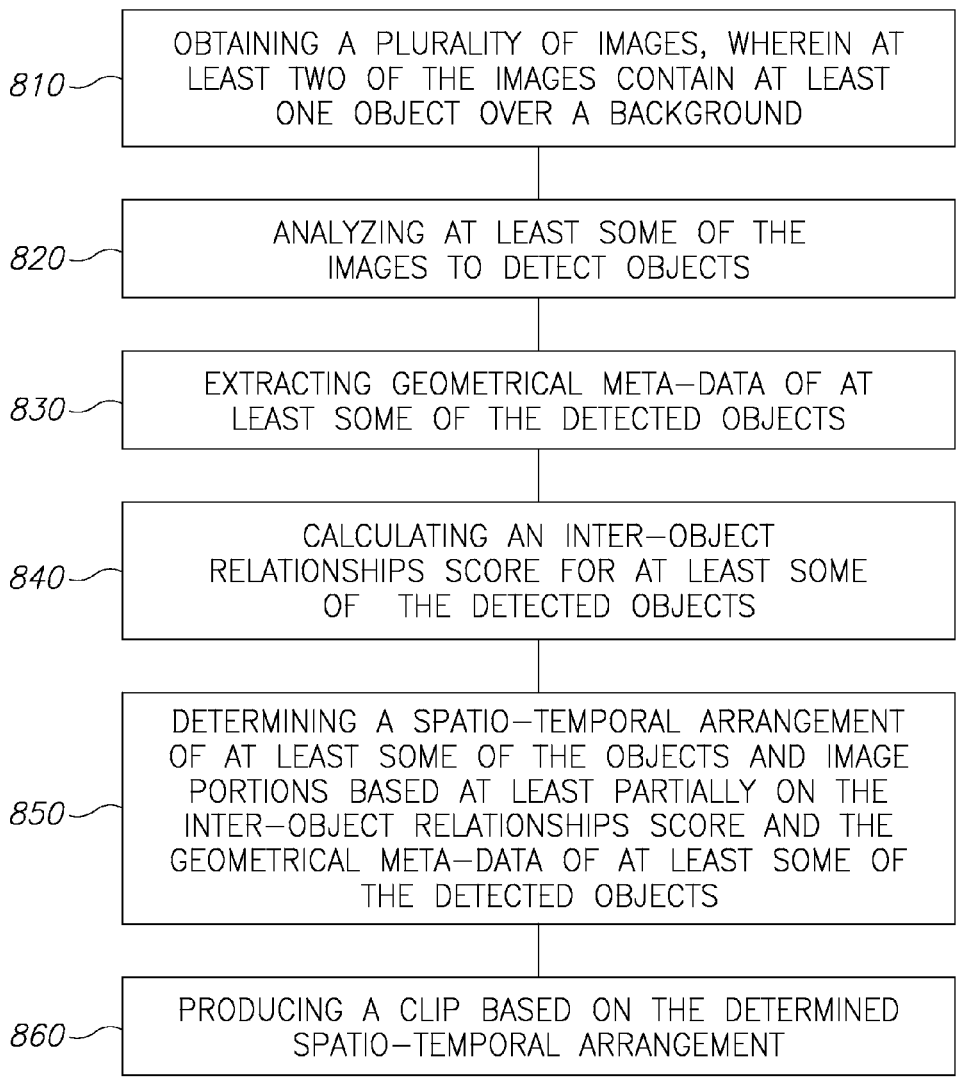
FIG. 8 is a flowchart diagram illustrating an aspect of the method in accordance with embodiments according to the present invention.

FIG. 8 is a flowchart diagram illustrating a generalized method implementing embodiments of the present invention. The method may include: obtaining a plurality of images, wherein at least two of the images contain at least one object over a background 810; analyzing at least some of the images to detect objects 820; extracting geometrical meta-data of at least some of the detected objects 830; calculating an inter-object relationships score for at least some of the detected objects 840; determining a spatio-temporal arrangement of at least some of the objects and image portions based at least partially on the inter-object relationships score and the geometrical meta-data of at least some of the detected objects 850; and producing a clip based on the determined spatio-temporal arrangement 860.

According to some embodiments of method 800, the spatio-temporal arrangement may include duplicating at least one of the detected objects or images or omitting at least one of the detected objects or images.

According to some embodiments of method 800, the determining of the spatio-temporal arrangement may include cropping at least one of the images, substantially around at least one of the detected objects, based on the corresponding inter-object relationships score. Specifically, the spatio-temporal arrangement may results in at least two consecutive selections of the same object undergoing two different cropping operations.

According to some embodiments of method 800, the calculating of the inter-object relationships score may be carried out using a cost function.

According to some embodiments of method 800, the determining a spatio-temporal arrangement may be further based on meta-data other than the geometrical meta-data of at least some of the detected objects.

According to some embodiments of method 800, the production may further include generating transitions between the at least some of the extracted objects, based at least partially on the corresponding inter-object relationships score.

According to some embodiments of method 800, the production may further include generating a music sequence along the sequence of the extracted objects, based at least partially on the corresponding inter-object relationships score.

According to some embodiments of method 800, the inter-object relationships may include at least one of the following relationships: the objects are looking at each other: the objects are within a predefined time-space from each other; the objects are talking to each other; the objects are engaged in a similar activity.

According to some embodiments of method 800, the inter-object relationships score may be affected positively by a preference for placing two objects close in time in a case said two objects are strongly related.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:
   obtaining a plurality of images, wherein at least two of the images contain at least one object over a background;
   analyzing at least some of the images to detect objects;
   extracting geometrical meta-data of at least some of the detected objects;
   calculating an inter-object relationships score for at least some of the detected objects;
   determining a spatio-temporal arrangement of at least some of the objects and image portions based at least partially on the inter-object relationships score and the geometrical meta-data of at least some of the detected objects; and
   producing a clip based on the determined spatio-temporal arrangement.

2. The method according to claim 1, wherein the spatio-temporal arrangement further comprises duplicating at least one of the detected objects.

3. The method according to claim 1, wherein the spatio-temporal arrangement further comprises omitting at least one of the detected objects.

4. The method according to claim 1, wherein the spatio-temporal arrangement further comprises omitting at least one of the input images.

5. The method according to claim 1, wherein the determining of the spatio-temporal arrangement comprises cropping at least one of the images, substantially around at least one of the detected objects, based on the corresponding inter-object relationships score.

6. The method according to claim 1, wherein the calculating of the inter-object relationships score is carried out using a cost function.

7. The method according to claim 1, wherein the determining a spatio-temporal arrangement is further based on meta-data other than the geometrical meta-data of at least some of the detected objects.

8. The method according to claim 1, wherein the production further comprises generating transitions between the at least some of the extracted objects, based at least partially on the corresponding inter-object relationships score.

9. The method according to claim 1, wherein the production further comprises generating a music sequence along the sequence of the extracted objects, based at least partially on the corresponding inter-object relationships score.

10. The method according to claim 5, wherein the spatio-temporal arrangement results in at least two consecutive selections of the same object undergoing two different cropping operations.

11. The method according to claim 1, wherein the inter-object relationships comprises at least one of the following relationships: the objects are looking at each other: the objects are within a predefined time-space from each other; the objects are talking to each other; the objects are engaged in a similar activity.

12. The method according to claim 1, wherein the inter-object relationships score is affected positively by a preference for placing two objects close in time in a case said two objects are strongly related.

13. A system comprising:
   a memory configured to store a plurality of images, wherein at least two of the images contain at least one object over a background; and
   a computer processor configured to:

analyze at least some of the images to detect objects;
extract geometrical meta-data of at least some of the detected objects;
calculate an inter-object relationships score for at least some of the detected objects;
determine a spatio-temporal arrangement of at least some of the objects and image portions based at least partially on the inter-object relationships score and the geometrical meta-data of at least some of the detected objects; and
produce a clip based on the determined spatio-temporal arrangement.

14. The system according to claim 13, wherein the spatio-temporal arrangement further comprises duplicating at least one of the detected objects.

15. The system according to claim 13, wherein the spatio-temporal arrangement further comprises omitting at least one of the detected objects.

16. The system according to claim 13, wherein the spatio-temporal arrangement further comprises omitting at least one of the input images.

17. The system according to claim 13, wherein the determining of the spatio-temporal arrangement comprises cropping at least one of the images, substantially around at least one of the detected objects, based on the corresponding inter-object relationships score.

18. The system according to claim 13, wherein the calculating of the inter-object relationships score is carried out using a cost function.

19. The system according to claim 13, wherein the determining a spatio-temporal arrangement is further based on meta-data other than the geometrical meta-data of at least some of the detected objects.

20. The system according to claim 13, wherein the production further comprises generating transitions between the at least some of the extracted objects, based at least partially on the corresponding inter-object relationships score.

21. The system according to claim 13, wherein the production further comprises generating a music sequence along the sequence of the extracted objects, based at least partially on the corresponding inter-object relationships score.

22. The system according to claim 17, wherein the spatio-temporal arrangement results in at least two consecutive selections of the same object undergoing two different cropping operations.

23. The system according to claim 13, wherein the inter-object relationships comprises at least one of the following relationships: the objects are looking at each other: the objects are within a predefined time-space from each other; the objects are talking to each other; the objects are engaged in a similar activity.

24. The system according to claim 13, wherein the inter-object relationships score is affected positively by a preference for placing two objects close in time in a case said two objects are strongly related.

* * * * *